No. 812,664. PATENTED FEB. 13, 1906.
T. P. MEINHARD.
TRANSMISSION GEAR FOR MOTOR VEHICLES.
APPLICATION FILED AUG. 7, 1905.
2 SHEETS—SHEET 2.
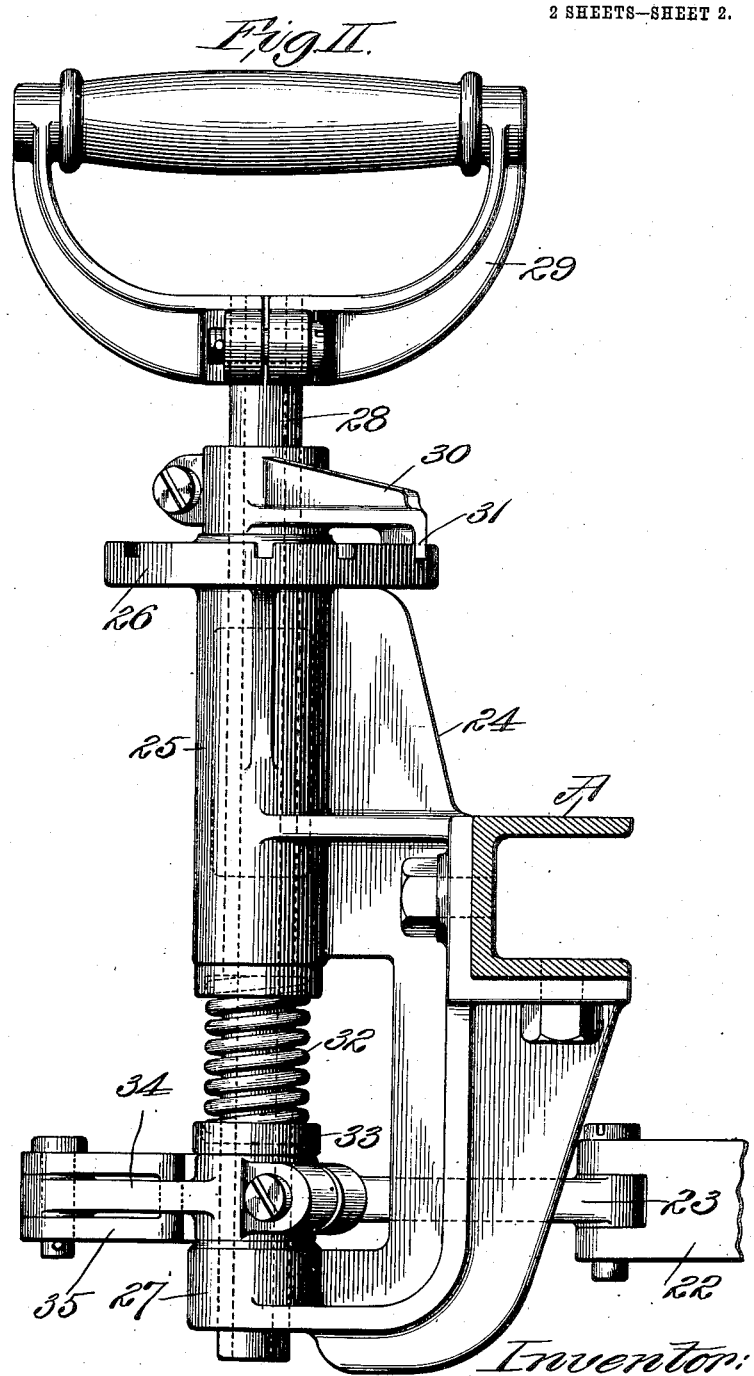
Fig. II.

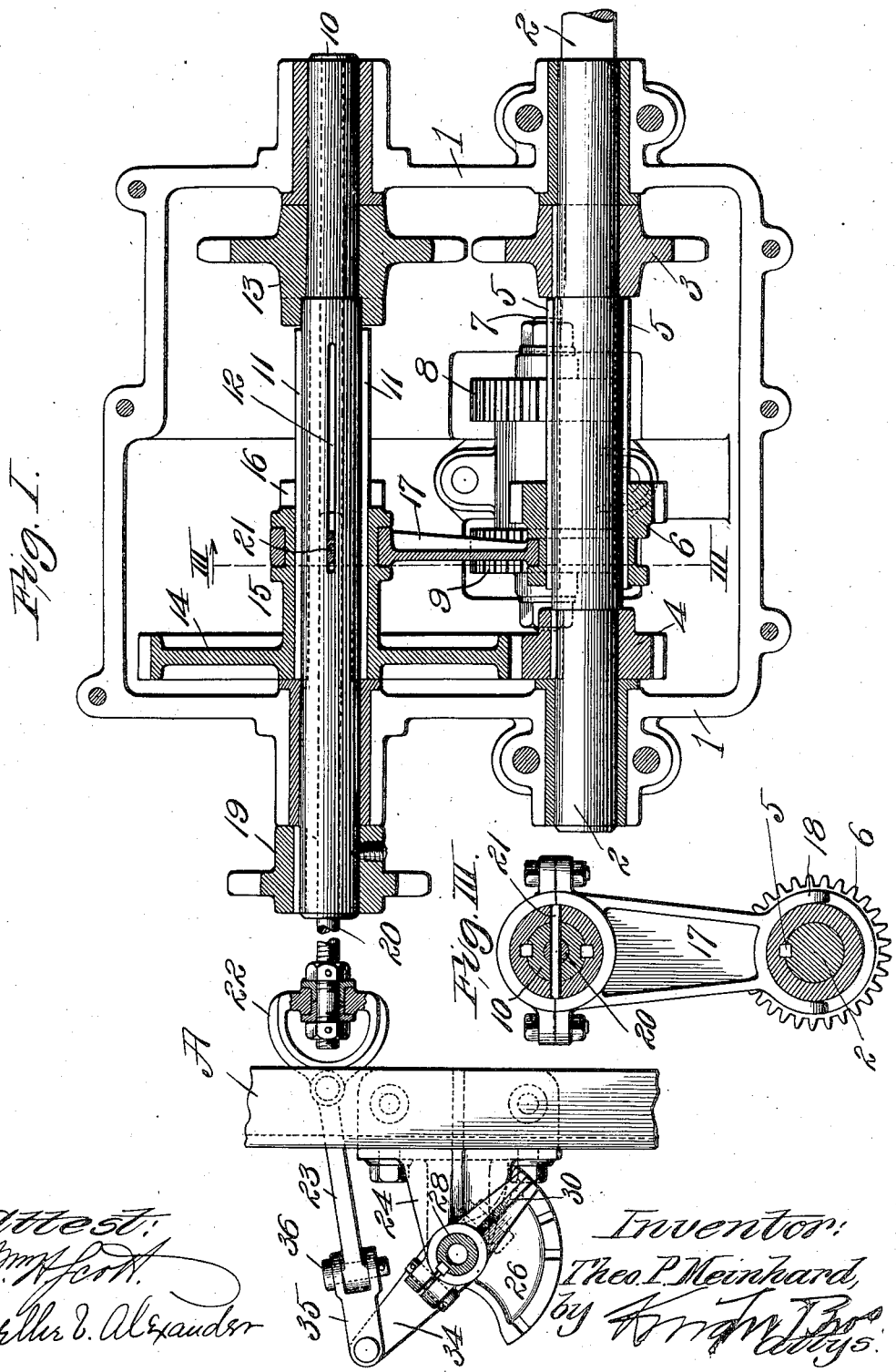

UNITED STATES PATENT OFFICE.

THEODORE P. MEINHARD, OF ST. LOUIS, MISSOURI, ASSIGNOR TO ST. LOUIS CAR COMPANY, OF ST. LOUIS, MISSOURI, A CORPORATION.

TRANSMISSION-GEAR FOR MOTOR-VEHICLES.

No. 812,664.     Specification of Letters Patent.     Patented Feb. 13, 1906.

Application filed August 7, 1905. Serial No. 273,189.

*To all whom it may concern:*

Be it known that I, THEODORE P. MEINHARD, a citizen of the United States, residing in the city of St. Louis, in the State of Missouri, have invented certain new and useful Improvements in Transmission-Gears for Motor-Vehicles, of which the following is a full, clear, and exact description, reference being had to the accompanying drawings, forming part of this specification.

My invention relates to a transmission-gear for motor-vehicles; and, briefly stated, it consists in means for shifting the reciprocating gear members of the gear.

Figure I is a view, partly in plan and partly in horizontal section, of my gear. Fig. II is an enlarged elevation of the shifting-mechanism-actuating rock-shaft of my transmission-gear and coexisting parts. Fig. III is a vertical cross-section taken on line III III, Fig. I.

1 designates the housing of my transmission-gear. 2 is the main drive-shaft journaled in said housing and which may be driven by applying power thereto in any desirable manner. This drive-shaft has keyed to it a direct driving-wheel 3 and a reverse driving-pinion 4. The shaft is provided intermediate of the wheel 3 and pinion 4 with feathers 5.

6 is a reciprocatory gear-wheel that is fitted to the drive-shaft and is adapted to be shifted longitudinally thereof on the feathers 5.

7 designates a counter-shaft adjacent to the drive-shaft and on which are rigidly mounted counter gear-wheels 8 and 9, the former of which is adapted to receive the mesh of the reciprocatory gear-wheel 6.

10 designates a driven shaft which is journaled in the housing 1 and extends parallel with the drive-shaft 2. This driven shaft is provided with feathers 11, extending longitudinally thereof, and it contains a longitudinal slot 12.

13 is a toothed driving-wheel loosely mounted upon the driven shaft opposite to the toothed drive-wheel on the drive-shaft, these toothed wheels being adapted to be connected by a drive-chain, through the medium of which power may be communicated from the drive-shaft to said toothed wheel 13.

14 designates a reciprocatory transmission gear-wheel mounted on the driven shaft 10 and held from rotation thereon by the feathers 11. The hub of this transmission gear-wheel is provided with an extension 15, the end of which terminates in a clutch member 16, that is adapted to be moved into clutching engagement with the opposing end of the loosely-mounted toothed wheel 13.

17 is a shift-arm fitted to the hub extension 15 and having a bifurcated end 18, that is fitted to the reciprocatory gear-wheel 6 on the drive-shaft 2. By the provision of this shift-arm the two reciprocatory gear members 6 and 14 are so united as to move together, and when movement is imparted to the transmission gear-wheel 14 a corresponding travel is imparted to the gear-wheel 6.

19 designates a gear member from which power is transmitted to the point at which it is applied to the running-gear of the motor-vehicle.

As the parts of my transmission-gear are illustrated in Fig. I the transmission gear-wheel 14 is in mesh with the reverse driving-pinion 4 to make the changes in securing direct driving action. The transmission gear-wheel 14 is first shifted on the driven shaft until it is freed from the reverse driving-pinion, thereby rendering the gearing natural. The movement of the transmission gear-wheel carries it into mesh with the counter gear-wheel 9 and also causes the gear-wheel 6 to be carried into mesh with the counter gear-wheel 8, whereby the motion of the drive-shaft 2 is communicated through the gear-wheel 6 to the counter gear-wheel 8 and through the counter-shaft 7 to the counter gear-wheel 9. From the last-named counter gear-wheel the motion is transmitted to the transmission gear-wheel 14 to drive said last-named gear-wheel and rotate the driven shaft 10. Under the driving action just explained a low speed is secured. When a high speed is to be secured, the transmission gear-wheel 14 is moved in the direction of its former movement until its clutch member 16 is brought into engagement with the loosely-mounted toothed wheel 13, the transmission gear-wheel 14 and the gear-wheel 6 being thereby shifted out of mesh with the counter gear-wheels 9 and 8. At this time the loosely-mounted toothed wheel 13, being in clutching engagement with the transmission gear-wheel 14, the toothed wheel 3, acting to drive the toothed wheel 13, causes said toothed wheel to drive the transmission gear-wheel, and as a consequence the driven shaft 10 is driven direct from the drive-shaft 2, thereby securing a high speed of rotation of the driven shaft.

I will next describe the shifting means by which the transmission gear-wheels 6 and 14 are reciprocated to change the speeds in my transmission-gear.

20 designates a slide-rod that is loosely mounted in the driven shaft 10 and extends therethrough to the slot 12 in said shaft. 21 is a cross-bar seated in the inner end of this slide-rod and extending into the slot in the driven shaft to reciprocate therein upon the reciprocation of the slide-rod. The slide-bar 21 is seated in the hub extension 15 of the transmission gear-wheel 14, as seen in Fig. III, thereby providing for the actuation of said transmission gear-wheel in a sliding manner upon the driven shaft when the slide-rod is reciprocated within said shaft. By this means the transmission gear-wheel 14 is moved to the desired positions to change the speed, and the gear-wheel 6 is moved correspondingly through the medium of the shift-arm 17.

22 is a yoke fitted to the outer end of the slide-rod 20, and 23 is a link-bar pivoted to said yoke.

24 designates a bracket secured to a fixed part of the motor-vehicle frame—as, for instance, the member A. (See Figs. I and II.) This bracket is provided with a tubular upper member 25, that bears a notched wing 26, and at the lower end of the bracket is an arm 27.

28 designates a rock-shaft that is loosely mounted in the member 25 of the bracket 24 and the lower end of which is seated in the bracket-arm 27.

29 is a handle fixed to the upper end of the rock-shaft 28 and through the medium of which it may be lifted to the desired extent for the purpose hereinafter named and rotated.

30 is a retaining-arm fixed to the rock-shaft and having a tooth 31, that is adapted to enter either of the notches in the bracket-wing 26 according to the degree of rotation of said rock-shaft and the shifting of the reciprocating members of the transmission-gear.

32 is a retractile spring surrounding the rock-shaft beneath the tubular bracket member 25 and bearing against a collar 33 on said shaft. This spring serves to yieldingly hold the rock-shaft in lowered position, so that the retaining-arm 30 will be maintained with its tooth in one of the bracket-arm wing-notches to hold the shaft from rotation, the spring being susceptible of yielding to permit of the rock-shaft being elevated when it is to be rotated to withdraw the retaining-arm from engagement with the bracket-wing.

34 is a crank-arm fixed to the rock-shaft 28. To the outer end of this crank-arm is pivoted a link 35, that is in turn pivotally connected at 36 to the link-bar 23. It will be seen that when the rock-shaft is elevated to release it and rocked the slide-rod 20 will be actuated through the medium of the parts intervening between the crank-arm 34 and said slide-rod to reciprocate the slide-rod and shift the transmission gear members 14 and 6 to the various positions hereinbefore referred to.

I claim as my invention—

1. In a transmission-gear, the combination of a shaft, a gear member slidably mounted upon said shaft, a slide-rod extending through said shaft and having engagement with said gear member, and a rock-shaft having connection with said slide-rod, substantially as set forth.

2. In a transmission-gear, the combination of a shaft, a gear member slidably mounted upon said shaft, a slide-rod extending through said shaft and having engagement with said gear member, a rock-shaft having connection with said slide-rod, and means carried by said rock-shaft for holding it in adjusted positions, substantially as set forth.

3. In a transmission-gear, the combination of a shaft, a gear member slidably mounted upon said shaft, a slide-rod extending through said shaft and having connection with said gear member, a rock-shaft connected to said slide-rod, an arm carried by said rock-shaft for restraining it from rotation, and a spring for yieldingly holding said rock-shaft from longitudinal movement, substantially as set forth.

4. In a transmission-gear, the combination of a shaft, a gear member slidably mounted upon said shaft and a slide extending through said shaft and having connection with said gear member, a bracket, a rock-shaft connected to said slide-rod and mounted in said bracket, and an arm carried by said rock-shaft; said bracket being provided with a notched head to receive said arm and restrain said rock-shaft from rotation, substantially as set forth.

THEODORE P. MEINHARD.

In presence of—
NELLIE V. ALEXANDER,
E. S. KNIGHT.